United States Patent [19]
Wright

[11] 3,807,890
[45] Apr. 30, 1974

[54] WATER POWER APPARATUS

[76] Inventor: Oliver D. Wright, 609 Rosedale Rd., Bellefonte, Del. 19809

[22] Filed: Oct. 12, 1972

[21] Appl. No.: 296,869

[52] U.S. Cl............................ 415/2, 415/7, 417/334
[51] Int. Cl................................................. F03d 7/00
[58] Field of Search.............................. 415/2–4, 7; 417/330–334

[56] References Cited
UNITED STATES PATENTS

| | | | |
|---|---|---|---|
| 1,782,277 | 11/1930 | Smith | 415/7 |
| 2,161,215 | 6/1939 | Wise | 415/5 |
| 3,816 | 11/1844 | Ross | 415/2 |
| 981,514 | 1/1911 | Ames | 417/334 |
| 1,034,940 | 8/1912 | Walker | 417/334 |
| 1,214,257 | 1/1917 | Arnold | 417/330 |
| 1,382,591 | 6/1921 | Ackerman | 415/4 |
| 1,522,820 | 1/1925 | Homola | 415/5 |
| 2,335,817 | 11/1943 | Topalov | 415/2 |

*Primary Examiner*—C. J. Husar
*Attorney, Agent, or Firm*—Mortenson & Weigel

[57] ABSTRACT

The apparatus described utilizes a raceway in which is disposed an inlet gate for concentrating and increasing the velocity of the water flowing through the raceway and also for directing the water to one side of the raceway for engagement with the paddles of a horizontally disposed water wheel. The inlet gate has a side wall which diverges against the direction of water flow. This side wall, which concentrates the water flowing into the raceway, is pivoted so that it can swing back to a neutral position to permit water flowing out of the raceway to exit freely. A second gate is disposed at the opposite end of the raceway to perform a similar function when the water is flowing in the opposite direction through the raceway.

7 Claims, 8 Drawing Figures

3,807,890

WATER POWER APPARATUS

BACKGROUND OF THE INVENTION

This invention relates to water wheels capable of making use of stream and river water flow as well as tidal water flow.

The application of hydroelectric power to the generation of electricity has been known for many years. While quite satisfactory, hydroelectric power installations are relatively expensive and require a long lead time to build. Furthermore, they are not always practical except in rivers of certain minimal water flow. In fact, they are not economically feasible for use in many moderate sized streams. Being fixed installations, they are virtually impossible to move and, hence, are virtually useless to meet the requirements of emergency power needs. In harnessing tidal energy, as opposed to that of rivers flows, many suggestions have been made over the years. Many of these suggestions have entailed relatively complicated, complex networks of coffer dams, concentrating valves, storage basins and the like, all of which amount to a relatively high cost and fixed installations requiring a long lead time.

It is, therefore, an object of this invention to provide an improved apparatus for utilizing the energy of flowing water, including stream, tide and river flows.

Another object of this invention is to provide an improved apparatus for utilizing the energy of flowing water, which apparatus is capable of being moved from location to location to supply emergency power needs.

Still another object of this invention is to obviate many disadvantages of the prior water-energy systems.

BRIEF DESCRIPTION OF THE INVENTION

In a preferred embodiment of this invention, apparatus is described for utilizing the energy of water flowing through a raceway. The apparatus comprises a first gate means for directing water flowing in a first sense into one side of the raceway, a power transmitting shaft substantially vertically disposed in the raceway, and a plurality of paddles mounted on and radially positioned about the shaft, thereby to be subjected to the water flow. Each of the paddles has a geometry operable for increasing its resistance to water flow and reducing its resistance against water flow.

In one embodiment of the invention, each of the paddles is of a shutter-like configuration which closes with water flow and opens against water flow. In still another embodiment, the first gate means includes a side wall diverging against water flow into the raceway in the first sense thereby to increase the flow rate of water past a portion of the paddles.

In still a further embodiment of the invention, a second gate for directing water flow is placed at the other end of the raceway thereby to permit imparting power to the power transmitting shaft regardless of the sense of the flow water through the raceway.

BRIEF DESCRIPTION OF THE DRAWINGS

The novel features that are considered characteristic of this invention are set forth with particularity in the appended claims. The invention, itself, however, both as to its apparatus and method, as well as additional objects and advantages thereof, will best be understood from the following description when read in connection with the accompanying drawings, in which:

DESCRIPTION OF THE PREFERRED EMBODIMENTS

Figure 1:
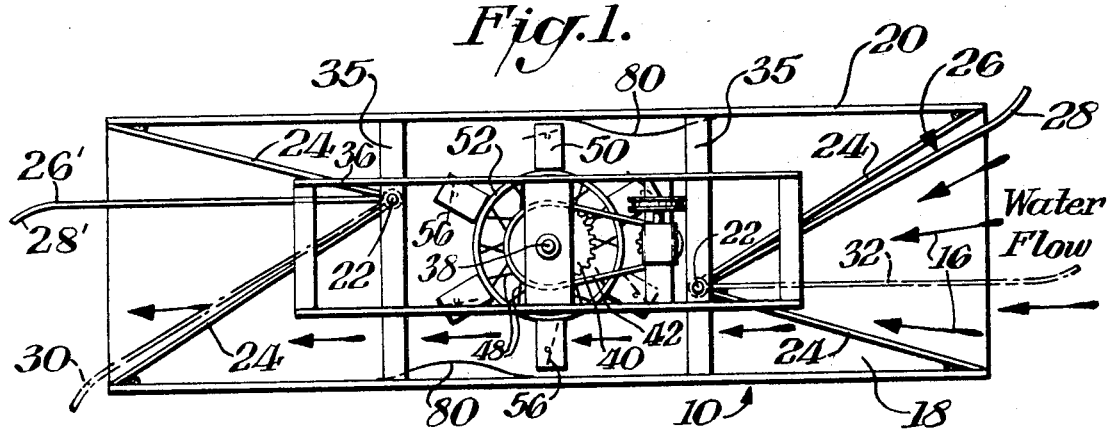
FIG. 1 is a plan view of a water wheel mounted in a raceway constructed in accordance with one embodiment of this invention.
Figure 2:
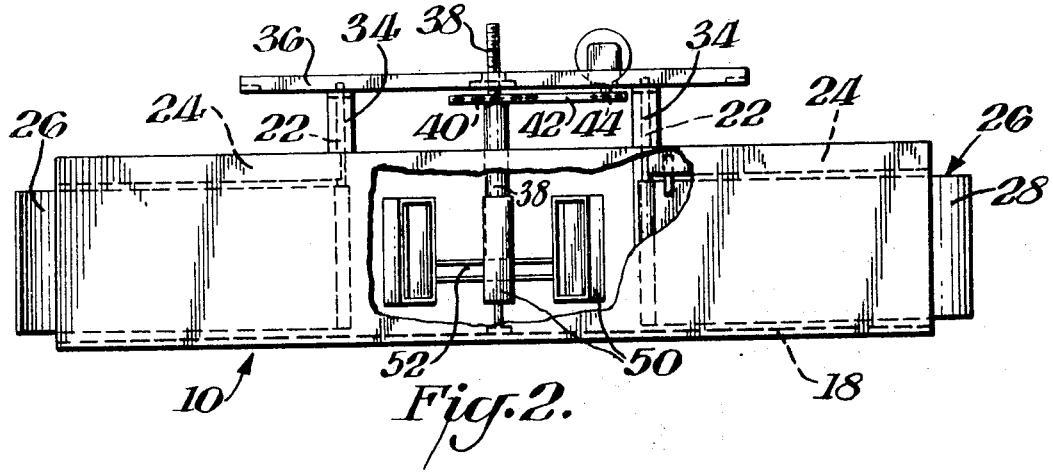
FIG. 2 is a side elevation view of the apparatus illustrated in FIG. 1.
Figure 5:
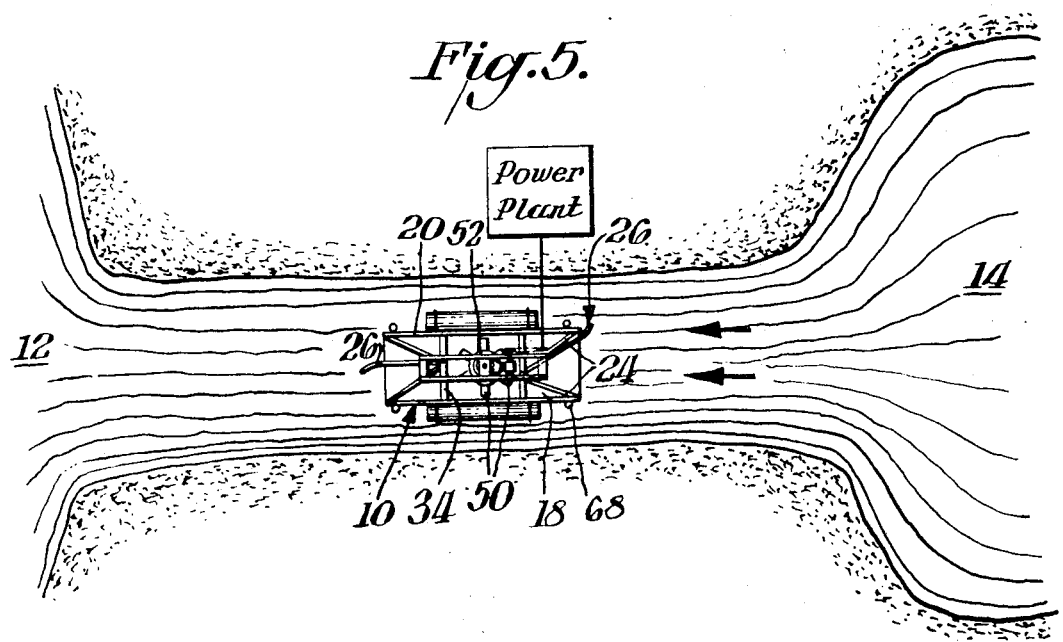
FIG. 5 is a pictorial view of the apparatus of this invention in use in a typical tidal application.
Figure 6:
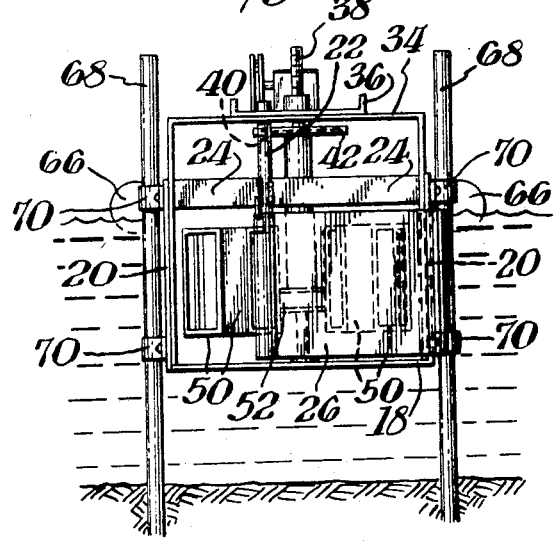
FIG. 6 is an end elevation view of a water wheel in position in a flowing stream with the raceway supported by floats.

There is illustrated in FIGS. 1 and 2 different views of a water wheel apparatus constructed in accordance with this invention. This apparatus includes a raceway 10 which may be either a permanent installation constructed of concrete or the like, or a movable installation constructed of a suitable metal or plastic. This raceway, rectangular in cross-section, may be constructed for positioning in a portion of a stream or river or may represent the connecting link between an open body of water 12 subject to tidal action and a storage area or basin 14 (FIG. 5). As will be illustrated and described, the raceway 10 may be positioned on the bottom of the river or other body of water, or it may be floated as seen in FIG. 6. In either case it will be assumed that the water is flowing from right to left in the drawing of FIG. 1 as would typically be exemplified, for example, with the approach of a high tide (FIG. 5) in a tidal application. The water flow direction is denoted by the arrows 16.

The raceway 10 has a bottom wall 18 and side walls 20 such as to form an open trough having a rectangular cross-section but open at the top. Toward either end of the raceway 10 there is a vertically disposed pivot rod 22 which is fixedly mounted in the bottom wall 18 of the raceway 10. The upper portion of the pivot is mounted by suitable brackets 24 which are secured as by welding or other suitable means to the side walls of the raceway. In the illustration given, the raceway 10 is constructed of metal. Alternatively, the raceway itself may be constructed of cement or other suitable material depending on the particular use intended.

A pivoted inlet gate 26 is pivotally mounted at one end to each of the pivot shafts 22 by suitable metal-forming or alternatively, by suitable hinges so as to be pivotable or movable in a horizontal plane although the gate, itself, is vertically positioned. The end portion of the gate 26 has a curved or contoured portion 28 which is curved (to the left in the drawing in the face of the oncoming water flow 16) such that the gate operates in the presence of water flow 16 to pivot leftwardly (as appears to one facing the oncoming water flow). This causes water flowing through the raceway to become concentrated on the other or right side of the raceway. The gate 26 may be said to diverge against the sense of water flow 16. This concentrating action has the function of increasing the flow rate of the water in the cross-sectional area remaining in the raceway and also to some extent increasing its depth as the water races to get through the constricted opening remaining. This action is enhanced by positioning the pivot shaft 22 to the right side of the raceway, as illustrated, so that the water is forced to converge and pass through an area comprising less than half of that of the cross-sectional area of the raceway.

At the other or back end of the raceway 10, there is positioned an exit or outlet gate 26'. The outlet gate 26' is similarly constructed to the inlet gate 26 and has a curved end portion 28'. In this instance, however, contrary to the action of the inlet gate 26, the outlet gate 26', in the presence of water flow 16, assumes a neutral position in the right side of the raceway with the same off center position as the inlet gate so as to afford minimum obstruction to the water flow.

Upon a reversal of the direction of water flow, the former outlet gate 26', due to the curved portion 28', swings to the position illustrated by the dashed lines 30' such that it diverts all of the inflowing water from the opposite direction to the right side of the trough. At the same time the former inlet gate 26 swings to the neutral position illustrated by the dashed lines 32 to permit the substantially unimpeded flow of water out of the raceway.

The pivot shaft 22 is recessed in holes (not shown) in support bars or beams 35 which support a main beam 36 in which is mounted the upper end of a power shaft 38 in a suitable bearing (not shown). The lower end of the power shaft 38 is mounted in a suitable bearing in the bottom wall 18 of the raceway 10. Fixedly secured to the power shaft 38 is a sprocket drive gear 40 which, acting through a chain drive 42, drives a suitable gear 44 through which power may be transmitted through an appropriate mechanical linkage to operate a generator, provide power to a specific mechanical system or other application desired. The gear 44 may be mounted in a bearing in the main beam 35. Alternatively, the power shaft 38 may be fixed with the gears and other members bearing mounted about it.

Figure 3C:
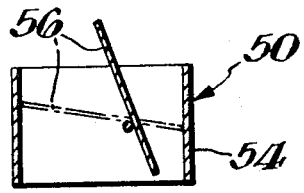
FIG. 3C is a cross-sectional plan view taken along the section lines 3C—3C depicting the shutter paddle in open position.
Figure 3A:
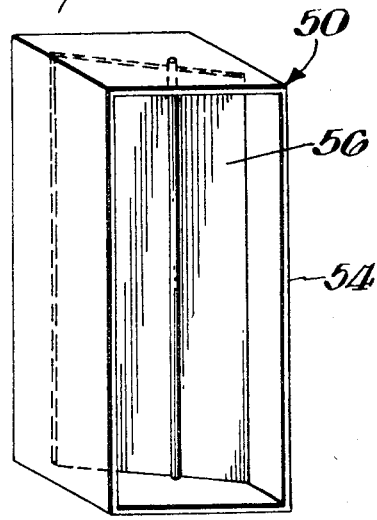
FIG. 3A is a back elevation view of a shutter paddle in closed position that may be employed in the invention illustrated in FIG. 1.
Figure 3B:
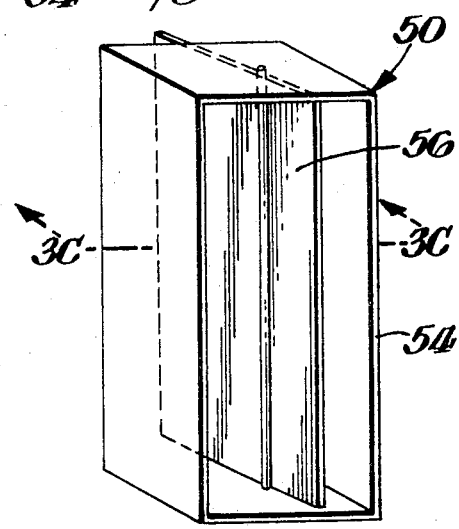
FIG. 3B is a back elevation view of a shutter paddle illustrated in FIG. 3A illustrated in open position.

Also secured to the lower end of the power transmitting shaft 38 are a plurality of radially disposed spokes 48 which position a reinforcing rim or wheel 52. A plurality of shutter paddles 50 are secured at intervals about the wheel. Each shutter paddle includes a rectangular housing 54 (FIGS. 3A, 3B and 3C) in which a vertically disposed, planar shutter 56 is eccentrically mounted so as to be capable of pivoting between open and closed positions. When water flows against one face of the shutter paddles, the eccentrically mounted shutter 56 is driven to a closed position (FIG. 3A) within the rectangular frame thereby blocking water flow and presenting an impedance to water flow such that the force of the flowing water acting against the closed shutter imparts motion to the wheel 52. Conversely, when water flows against the opposite face of the shutter, due to the eccentric mounting, the shutter is forced to pivot to an open position (FIGS. 3B and 3C) such that water may flow through the rectangular opening with little impedance or frictional drag. Thus, it may be said that the shutter paddles have a geometry operable for increasing resistance with water flow and reducing resistance against water flow when mounted to form a water wheel. The shutter paddles are mounted such that when closed they drive the wheel 52 in a clockwise sense when viewed from above.

As seen in the illustration given, with the water flowing in the sense 16, the inlet gate 26 is open such that it diverges toward the source of water flow thereby increasing the velocity of the water flow against those of the closed shutter paddles 50 on the right side of the raceway 10. This flowing water is permitted to exit throughout the entire cross-section of the raceway 10 since the outlet gate 26' is in a neutral position, i.e., the gate is open. The velocity of water flow in the left side of the raceway 10, in the region behind the inlet gate 26, is slight except for some small amount of turbulence. The shutter paddles thus are free to be rotated through this region, in an open position, and thus present little frictional drag. This would be the situation in a normal stream flow condition or in the illustration wherein, due to tidal action, the water is flowing in the direction indicated.

In the event that the raceway is in a tidal water situation, once high tide is reached, and the flow reverses, such that water is flowing oppositely to the direction 16, the former outlet gate 26' is forced to the righthand or bottom position in the drawing illustrated by the phantom line 30 such that the water is now directed to the opposite or left side of the rotating shutter paddles 50 - rotation of the power shaft remains in the same clockwise sense. The inlet gate 26 is forced, due to the reverse flow of water, to a neutral position, denoted by the phantom lines 32. The lefthand shutter paddles are permitted to open as they rotate through the protected region behind the former outlet gate 26' and present little frictional drag on the wheel. Thus, regardless of the direction of water flow through the raceway, energy is transmitted to the power shaft 38.

Figure 4:
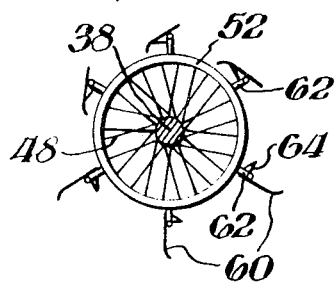
FIG. 4 is a pictorial view of another type of paddle that may be used on the water wheel in connection with this invention.

In an alternative embodiment of this invention a different type of paddle may be used on the power shaft 38. This paddle is such as that illustrated in FIG. 4. The paddles 60 are pivotably mounted to the wheel 52 as previously disclosed. The pivot action is such that the paddles may pivot between an open stop 62 and a closed stop 64. The pivot action is such that the paddles operate to open and provide their full face to the flow water, i.e., they increase resistance with water flow. On the other hand, as the paddles reach the backside of the wheel, wherein the water is not flowing as rapidly, and move against the direction of water flow, they tend to fold back to the back stop 64 and thereby offer less resistance to the water. Stated differently, they reduce resistance against water flow.

In the embodiment illustrated in FIG. 6, the raceway 10 and the entire assembly illustrated in FIG. 1 is constructed of a suitable metal and is movable. For this purpose the raceway 10 may be mounted on pontoons or floats 66 so that it may be floated into position in a desired stream or small river or for that matter may be positioned in a tidal water application. The raceway is anchored either by a chain or cable or by vertically driven poles 68 which slide in brackets 70 mounted on the sides of the raceway such that it may move vertically with the rise and fall of water level. The floating level of the raceway is selected such that the water will completely cover the shutter paddles and the raceway is positioned in the stream such that the paddles are subjected mainly to the flow of the upper portions of the water (the deeper portions of the water in a small stream are slower moving due to the friction of the stream bottom). Typically, the raceway is submerged almost completely with possibly only three inches or so of each side exposed to air.

The action of the water wheel in this instance is the same as that previously described, the primary difference being the movability of this unit and the ease of use in small streams. In an application where a tidal action is used it is useful to build even temporary coffer dams so as to concentrate the water flow through the raceway 10 of the unit illustrated in FIG. 6.

In one embodiment of the invention, contoured side deflectors 80, having a convex shape, are secured to the respective inner side walls 18 and 20 of the raceway to direct the flowing water to closer engagement with the water wheel.

There has thus been described a relatively simple, easy to construct raceway and water wheel arrangement which is capable of harnessing the energy of flowing water in many different applications. The device is economical to construct and easily movable from location to location and thus finds use as a temporary power source. If desired, a generator may be mounted directly on top of the unit so as to provide an integral power unit in and of itself.

It is obvious that many embodiments may be made of this inventive concept, and that many modifications may be made in the embodiments hereinbefore described. Therefore, it is to be understood that all descriptive material herein is to be interpreted merely as illustrative, exemplary, and not in a limited sense. It is intended that various modifications which might readily suggest themselves to those skilled in the art be covered by the following claims as far as the prior art permits.

What is claimed is:

1. Apparatus for utilizing the energy of water flowing through a raceway comprising:
   first gate means for directing water flowing in a first sense into one side of said raceway,
   a power transmitting shaft substantially vertically disposed in said raceway,
   a plurality of paddles mounted on and radially positioned about said shaft, thereby to be subjected to said water flow,
   said first gate means including a side wall diverging against water flow into said raceway in said first sense, thereby to increase the flow rate of said water past a portion of said paddles in said one side of said raceway,
   said side wall being pivotal in a horizontal plane between open and closed positions, and
   each of said paddles having a geometry operable for increasing resistance with said water flow through said one side of said raceway and reducing resistance against water flow.

2. An apparatus according to claim 1 wherein each of said paddles is of a shutter-like configuration which closes with water flow and opens against water flow.

3. An apparatus according to claim 1 wherein said side wall is pivotal about a point offset toward said one side from the center line of said raceway, thereby to further increase flow rate of said water past said paddles.

4. An apparatus according to claim 2 wherein said paddles each has a shutter having first and second faces and eccentrically mounted to pivot about a vertical axis between three positions, a first position in which it offers little resistance to the flowing water, a second position in which said flowing water imparts energy to said first face, and a third position in which said flowing water imparts energy to said second face, thereby to increase the efficiency of said apparatus.

5. An apparatus according to claim 2 wherein said paddles each have a rectangular housing, said paddles being pivotally mounted within said housing.

6. Apparatus for utilizing the energy of water flowing through a raceway, comprising:
   first gate means for directing water flowing in a first sense into one side of said raceway,
   a power transmitting shaft substantially vertically disposed in said raceway,
   a plurality of paddles mounted on and radially positioned about said shaft, thereby to be subjected to said water flow, and
   said paddles each have a shutter having first and second faces and eccentrically mounted to pivot about a vertical axis between three positions, a first position in which it offers little resistance to the flowing water, a second position in which said flowing water imparts energy to said first face, and a third position in which said flowing water imparts energy to said second face, thereby to increase the efficiency of said apparatus.

7. An apparatus according to claim 6 which also includes a second gate means for directing water flowing in a second sense, opposite said first sense, through another side of said raceway opposite said first side, said second gate means including a side wall diverging against water flowing in said second sense, said side wall being pivotal in a horizontal plane between open and closed positions, thereby to impart energy to said shaft regardless of the sense of water flow through said raceway.

* * * * *